(12) United States Patent
Joplin et al.

(10) Patent No.: US 10,294,029 B2
(45) Date of Patent: *May 21, 2019

(54) SYSTEMS AND METHODS FOR ACCUMULATION

(71) Applicant: Express Scripts, Inc., St. Louis, MO (US)

(72) Inventors: Jonathan W. Joplin, Chesterfield, MO (US); Jerry W. Christopher, Collinsville, IL (US); Charles E. Eller, Lake Saint Louis, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 634 days.

This patent is subject to a terminal disclaimer.

(21) Appl. No.: 15/000,395

(22) Filed: Jan. 19, 2016

(65) Prior Publication Data

US 2016/0130087 A1  May 12, 2016

Related U.S. Application Data

(62) Division of application No. 13/412,033, filed on Mar. 5, 2012, now Pat. No. 9,242,751.

(Continued)

(51) Int. Cl.
*B65G 1/00* (2006.01)
*B65G 1/137* (2006.01)
*B65B 57/02* (2006.01)
*B65B 7/28* (2006.01)
*B65B 43/52* (2006.01)

(Continued)

(52) U.S. Cl.
CPC .............. *B65G 1/1378* (2013.01); *B07C 3/00* (2013.01); *B07C 5/34* (2013.01); *B07C 5/3412* (2013.01); *B07C 5/36* (2013.01); *B07C 5/361* (2013.01); *B07C 5/38* (2013.01); *B21B 41/00* (2013.01); *B65B 5/04* (2013.01); *B65B 7/2807* (2013.01); *B65B 7/2842* (2013.01); *B65B 43/52* (2013.01); *B65B 57/02* (2013.01); *B65G 1/1373* (2013.01); *B67B 3/02* (2013.01); *B67B 3/06* (2013.01); *B67B 3/26* (2013.01); *G06F 7/00* (2013.01); *G06Q 10/087* (2013.01)

(58) Field of Classification Search
CPC ......................... G07F 17/0092; G06F 9/3462
See application file for complete search history.

(56) References Cited

U.S. PATENT DOCUMENTS 3,735,561 A  5/1973  Wood
3,765,145 A  10/1973 Davis
(Continued)

*Primary Examiner* — Timothy R Waggoner
(74) *Attorney, Agent, or Firm* — Armstrong Teasdale LLP

(57) ABSTRACT

Method and systems for accumulation are described. In one embodiment, a dispensing station includes a receiving opening, a dispensing opening and a storage area. The dispensing station receives and dispenses a container. A transportable storage system includes multiple partitions disposed on a carrier portion to define multiple carriage sections. The carriage sections are electronically identifiable and selectively hold or eject the container. A bin apparatus for receiving the container includes a movable portion to selectively hold and release the container. A control unit for commanding the bin apparatus to dispense the container to a desired carriage section of the transportable storage system is provided. Additional methods and systems are disclosed.

25 Claims, 10 Drawing Sheets

Related U.S. Application Data

(60) Provisional application No. 61/449,523, filed on Mar. 4, 2011.

(51) Int. Cl.
*G06F 7/00* (2006.01)
*B07C 3/00* (2006.01)
*B07C 5/34* (2006.01)
*B21B 41/00* (2006.01)
*B07C 5/36* (2006.01)
*B07C 5/38* (2006.01)
*B67B 3/02* (2006.01)
*B67B 3/06* (2006.01)
*B67B 3/26* (2006.01)
*B65B 5/04* (2006.01)
*G06Q 10/08* (2012.01)

(56) References Cited

U.S. PATENT DOCUMENTS

| | | | |
|---|---|---|---|
| 4,542,808 A | | 9/1985 | Lloyd et al. |
| 5,271,703 A | | 12/1993 | Lindqvist et al. |
| 5,515,664 A | | 5/1996 | Tanaka et al. |
| 5,711,657 A | * | 1/1998 | Hoffmeier ............ F04D 13/021 |
| | | | 415/141 |
| 5,943,841 A | | 8/1999 | Wunscher |
| 5,988,858 A | * | 11/1999 | Yuyama ................ B65G 1/1376 |
| | | | 700/213 |
| 6,208,908 B1 | | 3/2001 | Boyd et al. |
| 6,219,587 B1 | * | 4/2001 | Ahlin ................ G06F 19/3462 |
| | | | 700/233 |
| RE37,829 E | | 9/2002 | Charhut et al. |
| 7,809,467 B2 | * | 10/2010 | Schaefer ............. B65G 1/1378 |
| | | | 700/216 |
| 9,499,349 B2 | * | 11/2016 | Hansl ................... B65G 1/1378 |
| 9,745,131 B2 | * | 8/2017 | Hawkes ............... B65G 1/0471 |
| 2002/0087231 A1 | | 7/2002 | Lewis |
| 2009/0288996 A1 | | 11/2009 | Shafer |

* cited by examiner

SYSTEMS AND METHODS FOR ACCUMULATION

CROSS-REFERENCE TO A RELATED APPLICATION

This application is a divisional application of U.S. patent application Ser. No. 13/412,033 filed on Mar. 5, 2012; said application Ser. No. 13/412,033 claims priority under 35 U.S.C. § 119(e) to U.S. Provisional Patent Application No. 61/449,523 filed on Mar. 4, 2011. The entire disclosure of U.S. patent application Ser. No. 13/412,033 and U.S. Provisional Patent Application No. 61/449,523 are hereby incorporated herein by reference.

FIELD

The present application relates generally to the technical field of automated filling centers. In a specific example, the present application may relate to a high volume fulfillment center, e.g., a high volume pharmacy and to systems and devices used in filling prescriptions and prescription orders at a high volume pharmacy.

BACKGROUND

A high-volume pharmacy, such as a mail order pharmacy, may process and fill a large number of prescriptions and prescription orders. Automated systems may be used by a high volume pharmacy to process and fulfill prescriptions.

Often, more than one prescription drug is required to complete a prescription order. The fulfillment of prescriptions in the prescription order may be fulfilled in different areas of the high-volume pharmacy. After fulfillment, the fulfilled prescriptions are gathered into a complete prescription order for shipping.

DETAILED DESCRIPTION

Example systems and methods for accumulation are described. In the following description, for purposes of explanation, numerous specific details are set forth in order to provide a thorough understanding of example embodiments. It will be evident, however, to one of ordinary skill in the art these embodiments may be practiced without these specific details.

Generally, a prescription order is generated for a high volume pharmacy. The prescription order may include more than one prescription for fulfillment. The prescription in the prescription order constitutes an order component.

The prescriptions may be fulfilled at areas located at various sections of the high volume pharmacy. The accumulation of the order components is provided by the systems and methods herein. Order components may include containers, which may be a bottle, box, bag, can, or other device suitable for holding a pharmaceutical to be dispensed according to a prescription.

Generally, the order components are dispensed into one or more bin apparatus. The bin apparatus is selectively opened as a rotating transportable storage system moves underneath. The transportable storage system ejects the accumulated order components into a chute that may lead to an area for shipping preparation.

Figure 1:
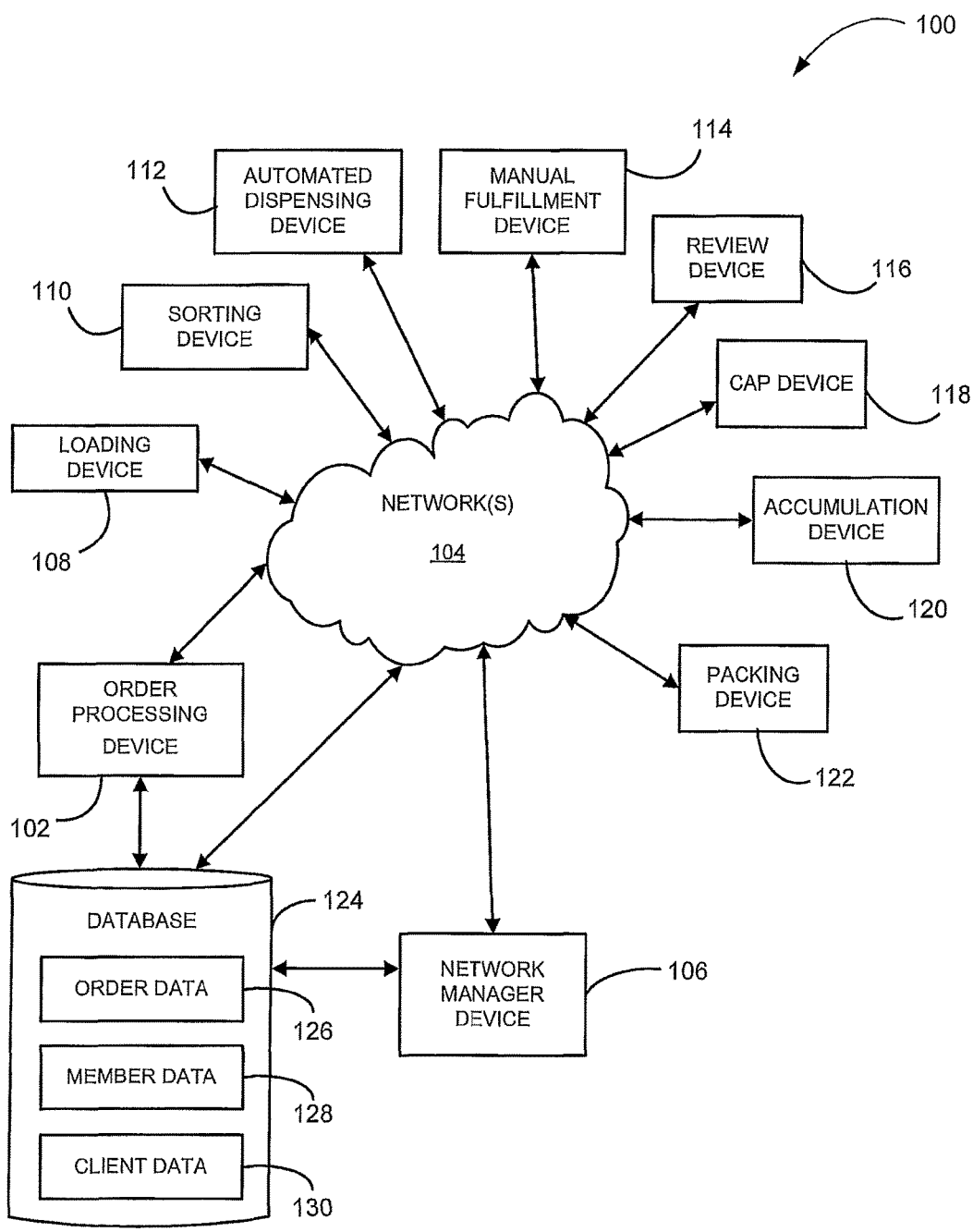
FIG. 1 is a block diagram of an example system according to an example embodiment.

FIG. 1 is a block diagram of an example system 100, according to an example embodiment. While the system 100 is generally described as being deployed in a high volume pharmacy, the automated filling system 100 may otherwise be deployed. The system 100 may include an order processing device 102 in communication with a network manager device 106 over a network 104.

The order processing device 102 may receive information about prescriptions being filled at a pharmacy in which the order processing device 102 is deployed. The order processing device 102 may track a prescription order as it is fulfilled. The order processing device 102 may make routing decisions and/or order consolidation decisions for a prescription order. The order processing device 102 may operate on its own or in combination with the network manager device 106.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Other conventional and/or later developed wired and wireless networks may also be used.

The network manager device 106 is a device operated by an entity at least partially responsible for creation and/or management of the pharmacy benefit. While the network manager operating the network manager device 106 is typically a pharmacy benefit manager (PBM), other entities may operate the network manager device 106 either on behalf of themselves, the PBM, or another entity. The network manager device 106 may include a processor, memory to store data and instructions, and a communication device.

Some of the operations of the PBM that operates the network manager device 106 may include the following. A member (or a person on behalf of the member) attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of machine, such as a kiosk, vending unit, mobile electronic device, or a different type of computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of the client with the PBM. The member's co-pay may be based on a flat co-pay (e.g., $10), coinsurance (e.g., 10%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug.

In conjunction with receiving the co-pay (if any) from the member and dispensing the prescription drug to the member, the pharmacy submits a claim to the PBM for the prescription drug. The PBM may perform certain adjudication functions including verifying the eligibility of the member, reviewing the formulary to determine appropriate co-pay, coinsurance, and deductible for the prescription drug, and performing a drug utilization review (DUR) on the member. The PBM then adjudicates the claim associated with the prescription drug and provides a response to the pharmacy following performance of the aforementioned functions. As part of the adjudication, the client (or the PBM on behalf of the client) ultimately reimburses the pharmacy for filling the prescription drug when the prescription drug was successfully adjudicated. The aforementioned adjudication functions generally occur before the co-pay is received and the prescription drug dispensed. However, the operations may occur simultaneously, substantially simultaneously, or in a different order. In addition, more or less adjudication functions may be performed as part of the adjudication process. Adjudication may be performed through the use of a machine, such as a computer system.

The amount of reimbursement paid to the pharmacy by the client and/or member may be based at least in part on the type of pharmacy network in which the pharmacy is included. Other factors may be used to determine the reimbursement amount in addition to the type of pharmacy network. The above methodologies may be implemented by executing instructions in the network manager device 106.

The system 100 may include a loading device 108, a sorting device 110, an automated dispensing device 112, a manual fulfillment device 114, a review device 116, a cap device 118, an accumulation device 120 and/or a packing device 122.

The loading device 108 may load prescription containers by a robotic arm, pick and place mechanism, or the like. In one embodiment, the loading device 108 has robotic anus or pickers to grasp a container and move it to and from a pallet. The pallet may be located on a conveyor assembly.

The sorting device 110 may receive containers and may identify the containers that belong to a particular prescription drug order. The sorting device 110 may group the containers according to the prescription drug order in which they belong.

The automated dispensing device 112 includes one or more devices that dispense prescription drugs or pharmaceuticals into containers in accordance with one or more prescription orders. Various automated dispensing systems are available commercially such as e.g., the system sold under the trademark OPTIFILL by AmerisourceBergen Corporation.

The manual fulfillment device 114 provides for manually fulfilling prescriptions. In general, a manual fulfillment may include operations at least partially performed by a pharmacist or pharmacy technician. For example, a person may retrieve a supply of the prescribed drug, may make an observation, may count out a prescribed quantity of drugs and place them into a container, or the like. Some portions of the manual fulfillment process may be automated by use of a machine. For example, counting of capsules, tablets or pills may be at least partially automated (e.g., through use of a pill counter). In some embodiments, the automated fulfillment is integrated with the manual fulfillment operations. Certain automated fulfillment may be performed before manual fulfillment and vice versa. The automated fulfillment for a prescription may be paused to allow for the manual fulfillment to be completed. Once the devices receive an input that manual fulfillment is complete, then the automated fulfillment is released and fulfillment proceeds automatically.

The review device 116 may process containers to be reviewed by a pharmacist. Fulfilled prescriptions may be reviewed and/or verified by a pharmacist, as may be required by state or local law. In other embodiments, prescriptions are reviewed and/or verified for quality assurance. A pharmacist or other licensed person who may dispense certain drugs in compliance with local and/or other laws may operate the review device 116 and visually inspect a container that has been filled with a prescription drug. The pharmacist may review, verify, and/or evaluate drug quantity, drug strength, and/or drug interaction concerns, or otherwise perform pharmacist services.

The cap device 118 may be used to cap a container. In some embodiments, the cap device 118 may provide a type of cap in accordance with a patient preference (e.g., a preference regarding child resistance). The cap device 118 may provide a crown portion, such as a ring or top, to cap the container. The ring or top operates cooperatively to provide child resistance. In other embodiments, no ring or top over a container may provide an easily-opened cap (e.g., for patients with fine motor disabilities).

The accumulation device 120 accumulates various prescription drugs in a prescription order. The accumulation device 120 may accumulate prescription containers from various area of the high volume fulfillment center. For example, the accumulation device 120 may accumulate prescription containers from the automated dispensing device 112, the manual fulfillment device 114 and the review device 116.

The packing device 122 packages a prescription order in preparation for shipping the order. The packaging device 122 may box or bag the fulfilled prescription order for delivery. The packaging device 122 may further place inserts into the box or bag. The packaging device 122 may label the box or bag with the address. The packaging device 122 may sort the box or bag for mailing in an efficient manner (e.g., sort by delivery address).

While the system 100 in FIG. 1 is shown to include single devices 102, 106, 108, 110, 112, 114, 116, 118, 120, 122 multiple devices may be used. The devices 102, 106, 108 110, 112, 114, 116, 118, 120, 122 may be the same type of device or may be different device types. When multiple devices are present, the multiple devices may be of the same device type or may be a different device type. Moreover, system 100 shows a single network 104; however, multiple networks can be used. The multiple networks may communicate in series with each other to link the devices 102, 106, 108 110, 112, 114, 116, 118, 120, 122 or in parallel to link the devices 102, 106, 108, 110, 112, 114, 116, 118, 120, 122. Multiple devices may share processing and/or memory resources. The devices 102-122 may be located in the same area or in different locations. For example, the devices 102-122 may be located in a building or set of adjoining buildings. The devices 102-122 may be interconnected (e.g. by conveyors), networked or otherwise in contact with one another.

In some embodiments, at least some of the functionality of the order processing device 102 may be included in the network manager device 106. In other embodiments, at least some of the functionality of the order processing device 102 may be included in the accumulation device 120 and vice versa.

The order processing device 102 may be in a client-server relationship with the network manager device 106, a peer-to-peer relationship with the network manager device 106, or in a different type of relationship with the network manager device 106.

The order processing device 102 and/or the network manager device 106 may be in communication directly (e.g., through local storage) and/or through the network 104 (e.g., in a cloud configuration or software as a service) with a database 124 (e.g., as may be retained in memory or otherwise). The database 124 may store order data 126, member data 128 and/or client data 130.

The order data 126 may include data used for completion of the prescription, such as prescription materials. Prescription materials are a type of order materials that include an electronic copy of information regarding the prescription drug for inclusion with the fulfilled prescription. The prescription materials may include electronic information regarding drug interaction warnings, recommended usage, possible side effects, expiration date, date of prescribing, etc.

The member data 128 includes information regarding the members associated with the benefit manager. Examples of the member data 128 include name, address, telephone number, e-mail address, prescription drug history, and the like. The member data 128 may include a client identifier that identifies the client associated with the member and/or a member identifier that identifies the member to the client. The member data 128 may include a member identifier that identifies the client associated with the patient and/or a patient identifier that identifies the patient to the client. The member data 128 may also include, by way of example, dispensation preferences such as type of label, type of cap, message preferences, language preferences, or the like. The member data 128 may be accessed by the devices 102, 106-122 to obtain the necessary information for fulfilling the prescription and shipping the prescription drugs.

The client data 130 includes information regarding the clients of the benefit manager. Examples of the client data 130 include company name, company address, contact name, contact telephone number, contact e-mail address, and the like.

Figure 2:
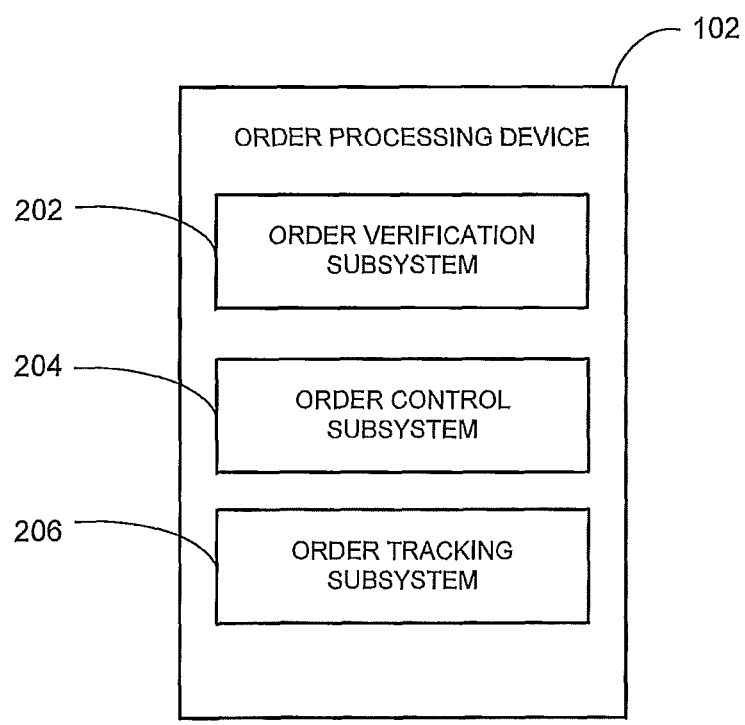
FIG. 2 is a block diagram of an example order processing device that may be deployed within the system of FIG. 1, according to an example embodiment.

FIG. 2 illustrates the order processing device 102, according to an example embodiment. The order processing device 102 may be used by one or more operators to generate prescription orders, make routing decisions, and/or make prescription order consolidation decisions. For example, the prescription order may be comprised of order components. The order processing device 102 may receive instructions to fulfill an order without operator intervention. An order component may include a prescription drug fulfilled in a container by the system 100. The order processing device 102 may direct an order component to the manual fulfillment device 114 or the review device 116 and direct other components to the automated dispensing device 112. The order processing device 102 may direct all order components to the accumulation device 120 for aggregation before shipping. The order processing device 102 may direct the order components directly to the packing device 122 if the prescription order does not require accumulation from various areas of the pharmacy for completion. The order processing device 102 may be deployed in the system 100, or may otherwise be used.

The order processing device 102 may include an order verification subsystem 202, an order control subsystem 204 and/or an order tracking subsystem 206.

The order verification subsystem 202 may communicate with the network manager device 106 to verify the eligibility of the member, review the formulary to determine appropriate co-pay, coinsurance, and deductible for the prescription drug, and/or perform a drug utilization review (DUR).

The order control subsystem 204 controls various movements of the containers and/or pallets along with various filling functions during progression through the system 100. For example, the order control subsystem 204 may identify the prescribed drug as needing to be fulfilled manually and may direct the container or order component to the manual fulfillment device 114 to achieve the manual fulfillment. The devices 108-122 may be interconnected by a system of conveyors or other container movement systems. Thus, the order control subsystem 204 may control various conveyors to deliver the pallet from the loading device 108 to the manual fulfillment device 114, for example.

The order tracking subsystem 206 tracks a prescription order as it progresses (or stops) toward fulfillment. The order tracking subsystem 206 may track, record and/or update order history, order status or the like. The order tracking subsystem 206 may store data locally (e.g., in a memory) or at the order data 124.

Figure 3:
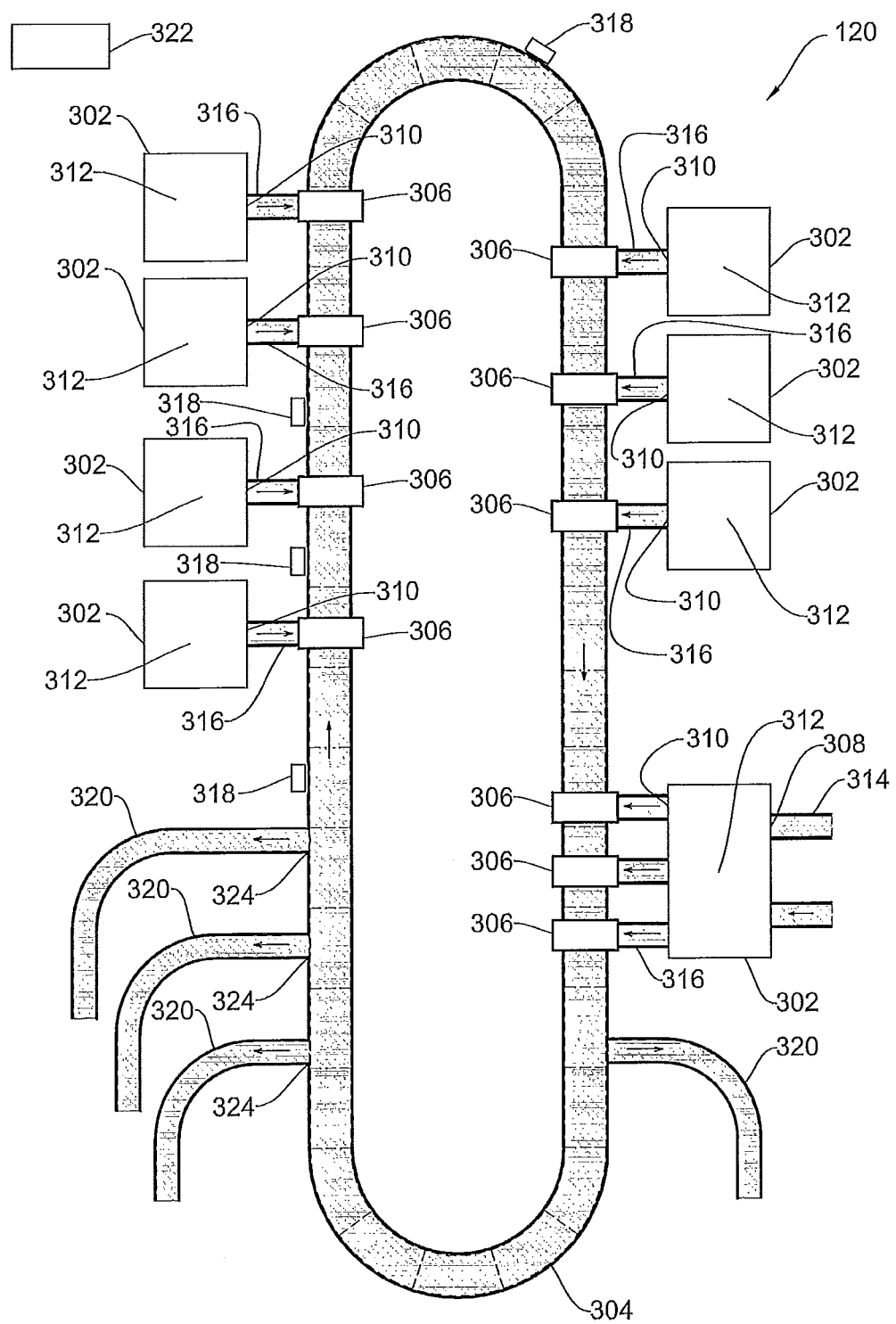
FIG. 3 is a schematic representation of the accumulation device that may be deployed within the system of FIG. 1, according to an example embodiment.

Referring now to FIG. 3, an accumulation device 120 is illustrated according to an example embodiment. The accumulation device 120 sorts and/or combines containers from different origins into a single area.

The accumulation device 120 includes multiple dispensing stations 302, a transportable storage system 304, and a bin apparatus 306. The multiple dispensing stations 302 dispense prescription drugs into the bin apparatus 306. The transportable storage system 304 rotates under the bin apparatus 306. The multiple dispensing stations 302 may include a receiving opening 308, a dispensing opening 310 and/or a storage area 312. Each of the dispensing stations 302 may include additional receiving openings 308, dispensing openings 310 and/or storage areas 312. As used herein, receiving opening 308, dispensing opening 310 and/or storage area 312 refer to single or additional receiving openings 308, dispensing openings 310 and/or storage areas 312.

The receiving opening 308 may be connected to a conveyor member 314 that is configured to transport containers to the dispensing station 302. The dispensing opening 310 may be connected to a conveyor member 316 that is configured to transport containers from the dispensing station 302 to the bin apparatus 306. Scanners 318 may be positioned at various locations proximal the transportable storage system 304 to read tags, bar codes, etc. so as to identify an area of the transportable storage system 304 at a desired time. The scanners 318 can be optical scanners, electronic scanners, or combinations thereof. The accumulation device 120 may further include a control unit 322 communicatively connected to the dispensing station 302, the transportable storage system 304 and/or the bin apparatus 306.

Figure 4:
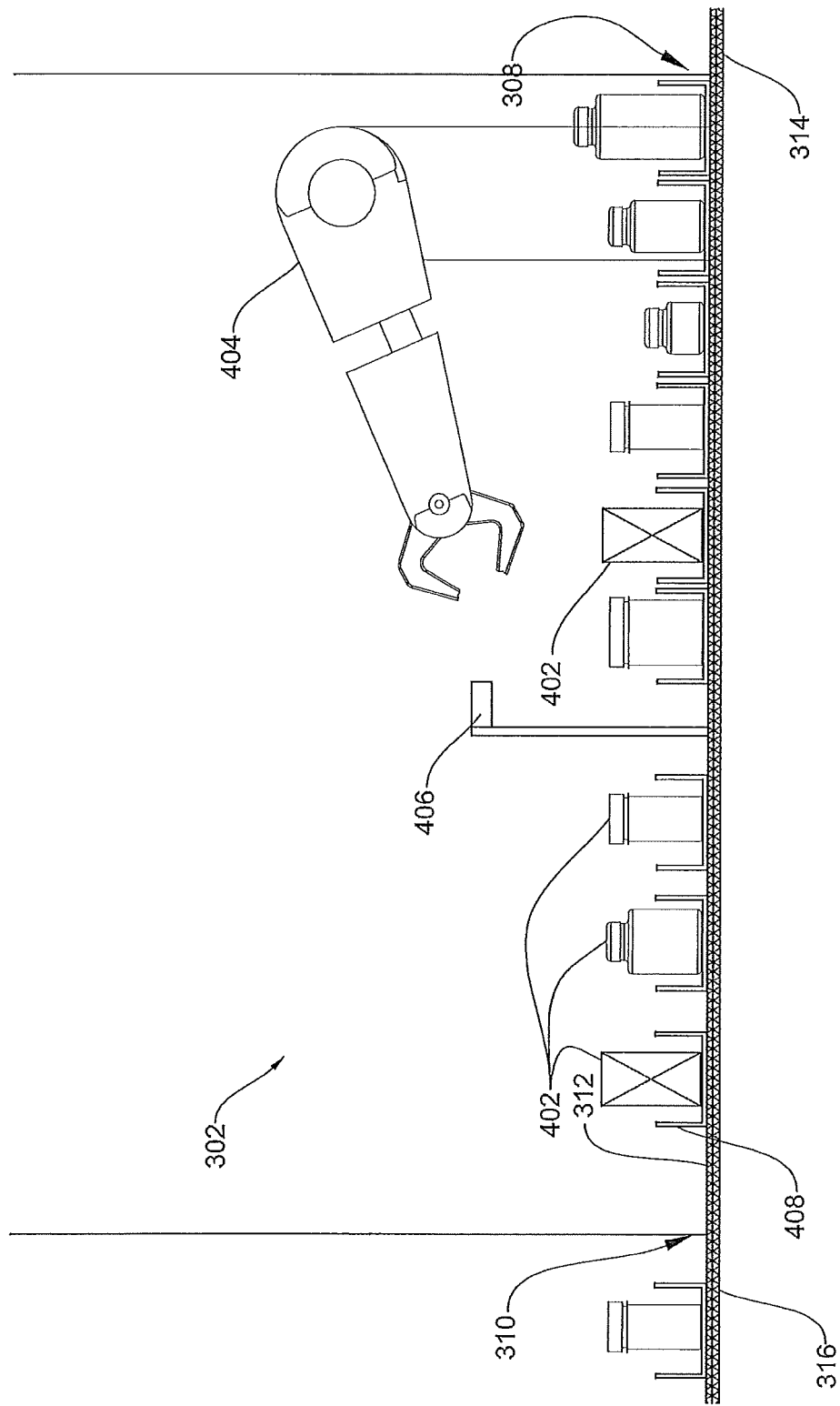
FIG. 4 is a schematic representation of a dispensing station that may be deployed in the accumulation device, according to an example embodiment.

Referring to FIG. 4, an example storage area 312 within the dispensing station 302 is illustrated. The storage area 312 may temporarily store containers 402 after they are received from the receiving opening 308. A robot picker 404 may pick a container 402 from the conveyor member 314 and position it proximal a container scanner 406. The robot picker 404 may rotate the container 402 about a horizontal or vertical axis to ensure scanning of a label placed on the exterior of the container 402. The robot picker 404 may then place the container 402 in a storage pocket 408 of the storage area 312 or may dispense the container 402 at the dispensing opening 310. Multiple containers 402 of an order may accumulate in the storage pocket 408. At a desired time, the robot picker 404 may pick the container 402 from the storage area 312 and dispense the container 402 at the dispensing opening 310 to the bin apparatus 306. In one embodiment, after picking from the storage area 312, the robot picker 404 may scan the container 402 before dispensing.

Figure 5:
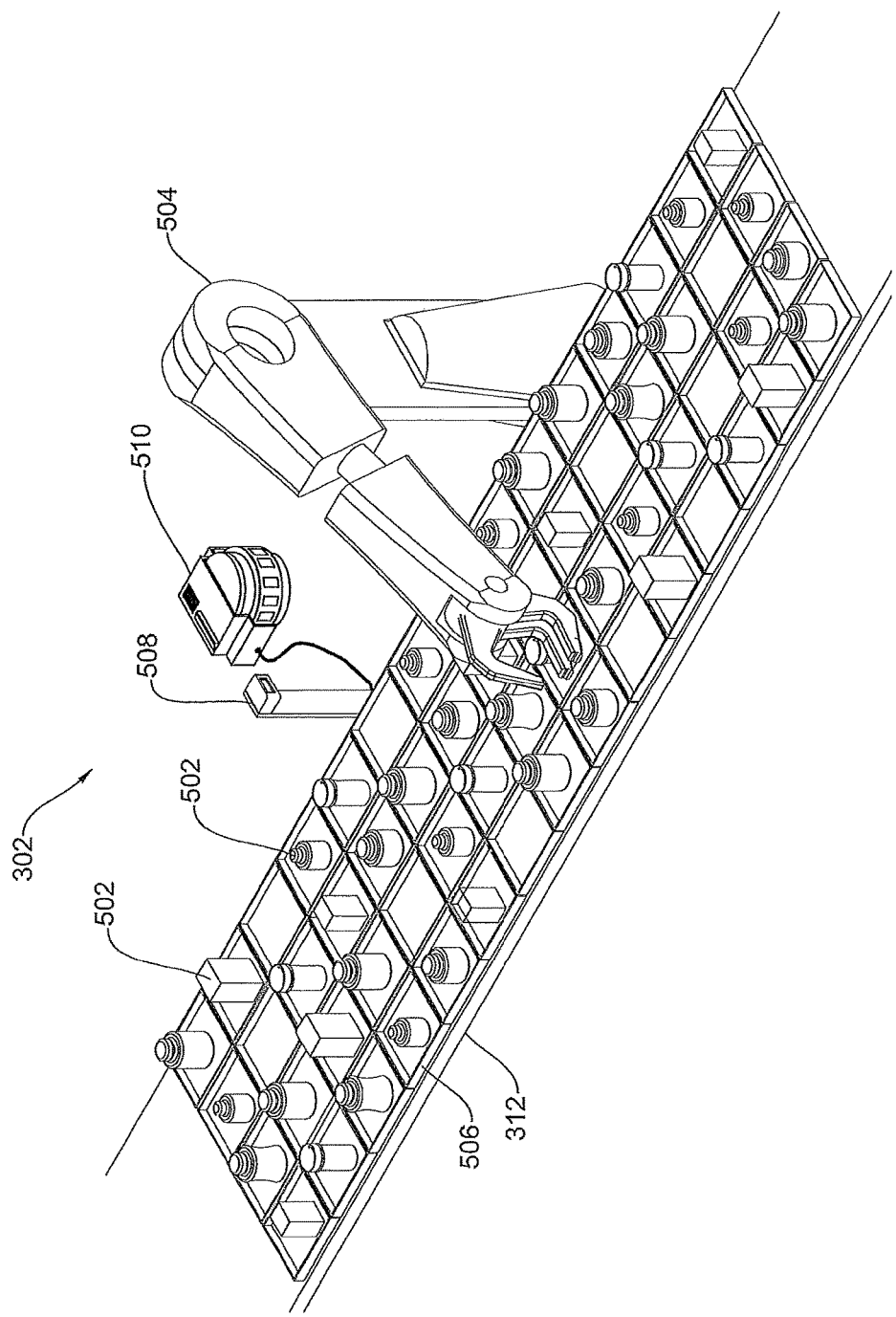
FIG. 5 is a schematic representation of a dispensing station for unit-of-use containers that may be deployed in the accumulation device, according to an example embodiment.

In other embodiments, as in the example storage area 312 of FIG. 5, the storage area 312 is an inventory storage area that holds many containers 502 until picked and dispensed by the robot picker 504. The storage area 312, having a rack 506, may be utilized at a dispensing station 302 that does not have a receiving opening 308 and/or a conveyor member 314. The containers 502 may be unit-of-use containers stored on a rack 506 until selection by the robot picker 504. The unit-of-use container 502 may be a product sealed in its own container at the manufacturer, for example. The robot picker 504 may pick a container 502 from the rack 506 and position it proximal a container scanner 508. The robot picker 504 may label the unit-of-use container 502 with a labeler 510 and scan the label with the container scanner 508 or a secondary scanner (not shown). The robot picker 504 may rotate the container 502 about a vertical or horizontal axis to ensure scanning of the label placed on the exterior of the container 502. The robot picker 504 may then dispense the unit-of-use container 502 through the dispensing opening 310 to the bin apparatus 306. In the case where more than one unit-of-use container 502 is in the prescription order, the robot picker 504 will repeat labeling at the labeler 510 and scanning at the container scanner 508 and dispensing to the bin apparatus 306 via the dispensing opening 310.

The robot picker 504 will repeat, picking the unit-of-use container 502 from the rack 506 and placing it proximal the container scanner 508 or the secondary scanner, until the bin apparatus 306 has accumulated all of the unit-of-use containers 502 in the prescription order.

The robot picker 404, 504 may be a robot such as a SCARA robot from Epson Robots of Carson, Calif. or Adept Technologies, Inc. of Pleasanton, Calif. The storage area 312 may be a manual dispensing area, where a pharmacy technician, for example, picks the container 402, 502 and/or scans the container 402, 502 before dispensing to the bin apparatus 306.

Figure 6A:
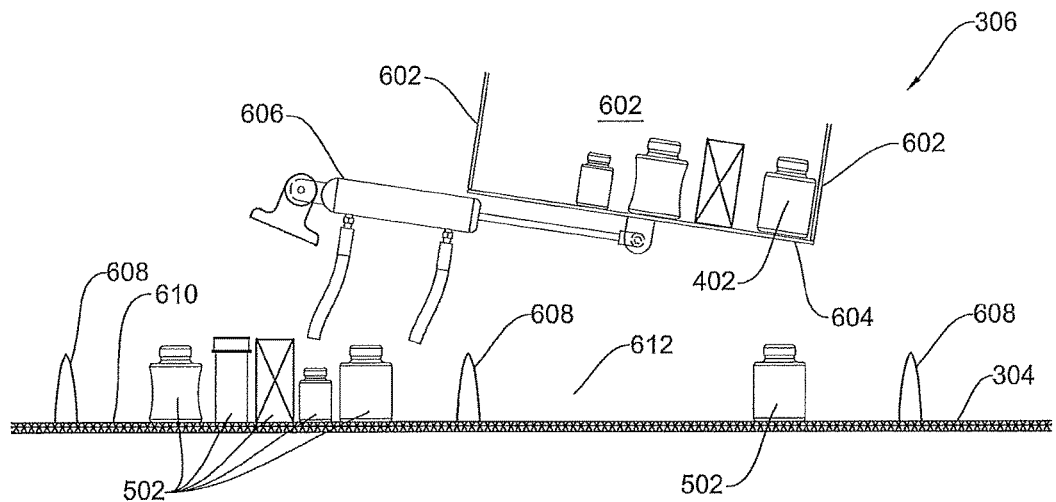
FIG. 6A is a partial cross-sectional view of the bin apparatus and transportable storage system with the bin apparatus closed, according to an example embodiment.
Figure 6B:
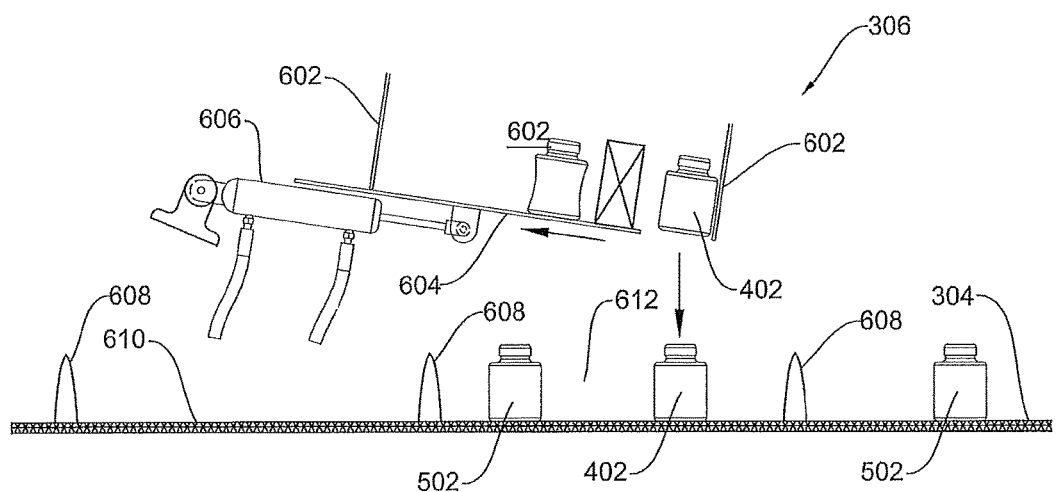
FIG. 6B is a partial cross-sectional view of the bin apparatus and transportable storage system with the bin apparatus partially opened, according to an example embodiment.

Referring to FIGS. 6A and B, an example bin apparatus 306 is shown according to an embodiment. The bin apparatus 306 is sized and configured to hold one or more containers 402, 502. The bin apparatus 306 includes one or more fixed portions 602 and a movable portion 604. The fixed portions 602 support the container 402, 502 while in the bin apparatus 306. The movable portion 604 is movably coupled to the fixed portion 602 to allow the bin apparatus 306 to selectively hold and release the container 402, 502. The bin apparatus 306 is disposed relative to the transportable storage system 304 such that movement by the movable portion 604 open the bin apparatus 306 to release the container 402, 502 to reach the transportable storage system 304. The movable portion 604 may be coupled to an actuator 606. The actuator 606 opens as shown in FIG. 6B and closes as shown in FIG. 6A the movable portion 604 at desired times. In the example shown in FIGS. 6A and 6B, the fixed portions 602 of the bin apparatus 306 can be vertical walls. The moveable portion 604 can be at least a part of the floor of the bin apparatus 306. The bin apparatus floor is positioned at an incline such that the container 402, 502 therein will be biased toward one end of the bin apparatus. In some embodiments, the moveable portion 604, when it is instructed to open, initially opens at the one end of the bin apparatus. It may be desired that the container 402, 502 maintains its orientation when it transitions from the bin apparatus 306 to the transportable storage system 304. The transportable storage system 304 can be essentially horizontal at the location where the container 402, 502 transitions from the bin apparatus 306 to the transportable storage system 304. The transportable storage system 304 may have a slight incline at the location (e.g., beneath the down arrow shown in FIG. 6B). Such a slight incline may match the incline of the bin apparatus or be at an angle less than the angle of the moveable portion 604 of the bin apparatus 306. In an example, the angle, relative to horizontal is less than 10 degrees+/−1 degree. The relative angle of the movable portion 604 of the bin apparatus relative to the transportable storage system 304 allows the container 402 to drop from the bin apparatus 306 to the transportable storage system 304 with the container maintaining its orientation and not tipping over on the transportable storage system 304.

The transportable storage system 304 may include multiple partitions 608 disposed on a carrier portion 610 to define multiple carriage sections 612. The carriage section 612 is disposed between two partitions 608. The carriage section 612 may store multiple containers 402, 502 of various sizes. The carriage section 612 may be electronically or optically identifiable with RFID tags, bar codes, or the like disposed at the carriage section 612. Scanners 318 may be positioned at various locations proximal the transportable storage system 304 to read tags, bar codes etc. so as to identify the location of the carriage section 612 at a desired time.

In the embodiment of FIG. 3, the transportable storage system 304 is a sorter device such as that from EuroSort, Inc. The carrier portion 610 is a continuous belt-like member. The carrier portion 610 may eject, slide or drop (via mechanism 324) the container 402, 502 out of the carriage section 612 and into a chute 320 for packaging and shipping. An exit mechanism 324, e.g., a gate, may control a container exiting into the chute 320.

Figure 7:
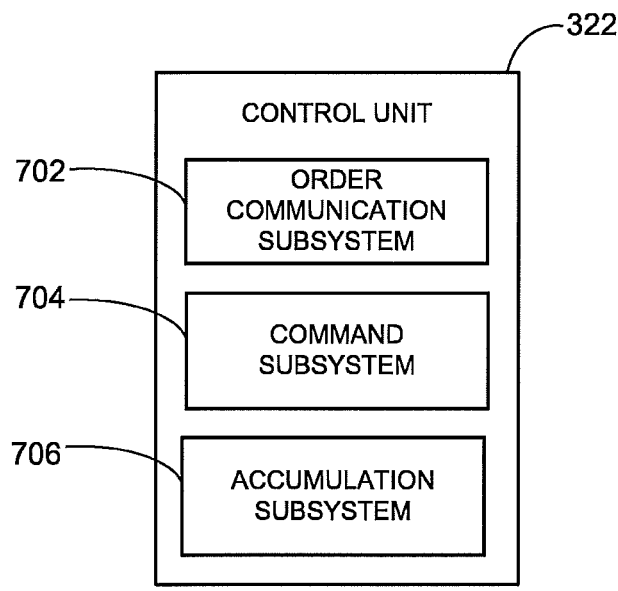
FIG. 7 is a block diagram of an example control unit that may be deployed in the accumulation device, according to an example embodiment.

Referring now to FIG. 7, a control unit 322 is illustrated according to an example embodiment. The control unit 322 is in electrical or optical communication connection with and may generate commands to the dispenser station 302, the transportable storage system 304, and the bin apparatus 306. The commands may be machine executable instructions that can be stored and executed by machines at appropriate times. The control unit 322 accesses data from the scanner 318 and/or the order processing device 102 to issue commands (to actuators or motors) accordingly. The control unit 322 may be deployed in the system 100, or may otherwise be used.

The control unit 322 may include an order communication subsystem 702, a command subsystem 704, and/or an accumulation subsystem 706.

The order communication subsystem 702 may be a communication gateway to enable the control unit 322 to communicate with the order processing device 102, dispensing station 304, transportable storage system 304 and/or bin apparatus 306. The order communication subsystem 702 may be in a wired connection with any one of the order processing device 102, the dispensing station 302, the transportable storage system 304 and/or the bin apparatus 306. In some embodiments, the order communication subsystem 702 may be in a wireless communication connection with any one of the order processing device 102, dispensing station 302, transportable storage system 304 and/or bin apparatus 306.

The command subsystem 704 enables the control unit 322 to issue commands to the dispensing station 302, transportable storage system 304 and/or bin apparatus 306. The commands may be machine executable instructions that can be stored and executed by machines at appropriate times.

The accumulation subsystem 706 enables the control unit 322 to access data for tracking movement and identifying containers and orders.

Figure 8:
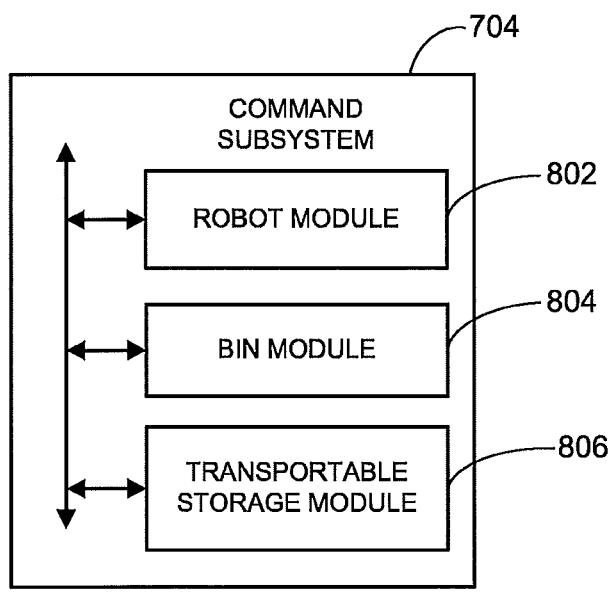
FIG. 8 is a block diagram of an example command subsystem that may be deployed in the control unit of FIG. 7, according to an example embodiment.

FIG. 8 illustrates an example command subsystem 704 that may be deployed in the control unit 322, the system 100 or otherwise deployed in the system 100. One or more modules are communicatively coupled and included in the command subsystem 704 to enable order accumulation. The modules of the command subsystem 704 that may be included are a robot module 802, a bin module 804, and/or a transportable storage module 806. Other modules may also be included. In one embodiment, the modules are deployed in memory and executed by a processor coupled to the memory. The functionality contained within the modules 802-806 may be combined into a lesser number of modules, further divided among a greater number of modules, or redistributed among existing modules. Other configurations including the functionality of the modules 802-806 may be used.

The robot module 802 generates and issues commands to the robot picker 404, 504. The commands may instruct the robot picker 404, 504 to maneuver to pick the container 402, 502, to scan the container 402, 502 and/or to dispense the container 402, 502. The commands are sufficient to instruct the robot picker 404, 504 to maneuver to carry out selected functions. For example, the robot picker 404, 504 may rotate the container 402, 502 about a horizontal or vertical axis to execute the scan at the container scanner 406, 508.

The bin module 804 generates and issues commands to the bin apparatus 306. The commands may instruct the bin apparatus 306 to open or close the movable portion 604. Specifically, the commands are sufficient to instruct the actuator 606 to move the movable portion 604 so that the bin apparatus 306 may be opened or closed. The bin module 804 may coordinate with the transportable storage module 806 to time the opening or closing of the bin apparatus 306 with a desired carriage section 612 being underneath the bin apparatus 306.

The transportable storage module 806 generates and issues commands to the transportable storage system 304. The commands may instruct the transportable storage system 304 to start or stop rotation, to rotate at various speeds and/or to eject the container 402, 502 into the chute 320. The transportable storage module 806 may coordinate with the bin module 804 to time the opening or closing of the bin apparatus 306 with a desired carriage section 612 being underneath the bin apparatus 306.

Figure 9:
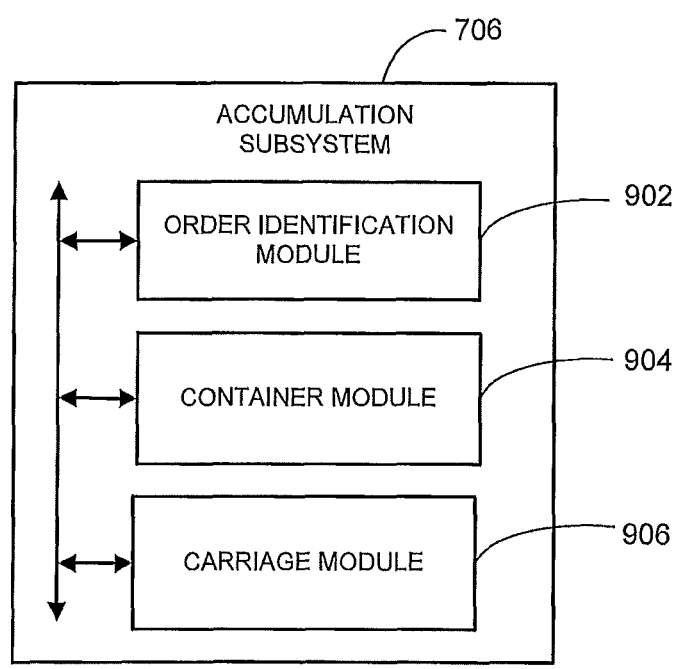
FIG. 9 is a block diagram of an example accumulation subsystem that may be deployed in the control unit of FIG. 7, according to an example embodiment.

FIG. 9 illustrates an example accumulation subsystem 706 that may be deployed in the control unit 322, the system 100, or otherwise deployed in another system. One or more modules are communicatively coupled and included in the accumulation subsystem 706 to enable accumulation of an order. The modules of the accumulation subsystem 706 that may be included are an order identification module 902, a container module 904, and/or a carriage module 906. Other modules may also be included.

In one embodiment, the modules are deployed in memory and executed by a processor coupled to the memory. The functionality contained within the modules 902-906 may be combined into a lesser number of modules, further divided among a greater number of modules, or redistributed among existing modules. Other configurations including the functionality of the modules 902-906 may be used.

The order identification module 902 identifies and associates order components as part of a prescription order with an order component identification attribute. The order identification module 902 may store the order components and prescription order locally or remotely, such as at the database. Each order component may be the container 402 or a unit-of-use container 502.

The container module 904 tracks the order components at the dispensing station 302 and the bin apparatus 306. The container module 904 may track the order components dispensed into the bin apparatus 306 with an order component identification attribute. The order component identification attribute may identify the container 402, 502 and associate the order component with the prescription order that is desired to be aggregated. The order component identification attribute may be an RFID tag, a bar code, a QR code or other identification.

The carriage module 906 tracks the movement and/or location of the carriage section 612 of the transportable storage system 304. The carriage module 906 may communicate with the container module 904 to coordinate dropping order components from more than one bin apparatus 306 into the same carriage section 612 as the transportable storage system 304 rotates. The carriage module 906 may coordinate with the container module 904 to establish that the last or slowest container 402, 502 is dispensed. The carriage module 906 may coordinate with the bin module 804 to determine a time or detect when the carriage section 612 is underneath the bin apparatus 306.

Figure 10:
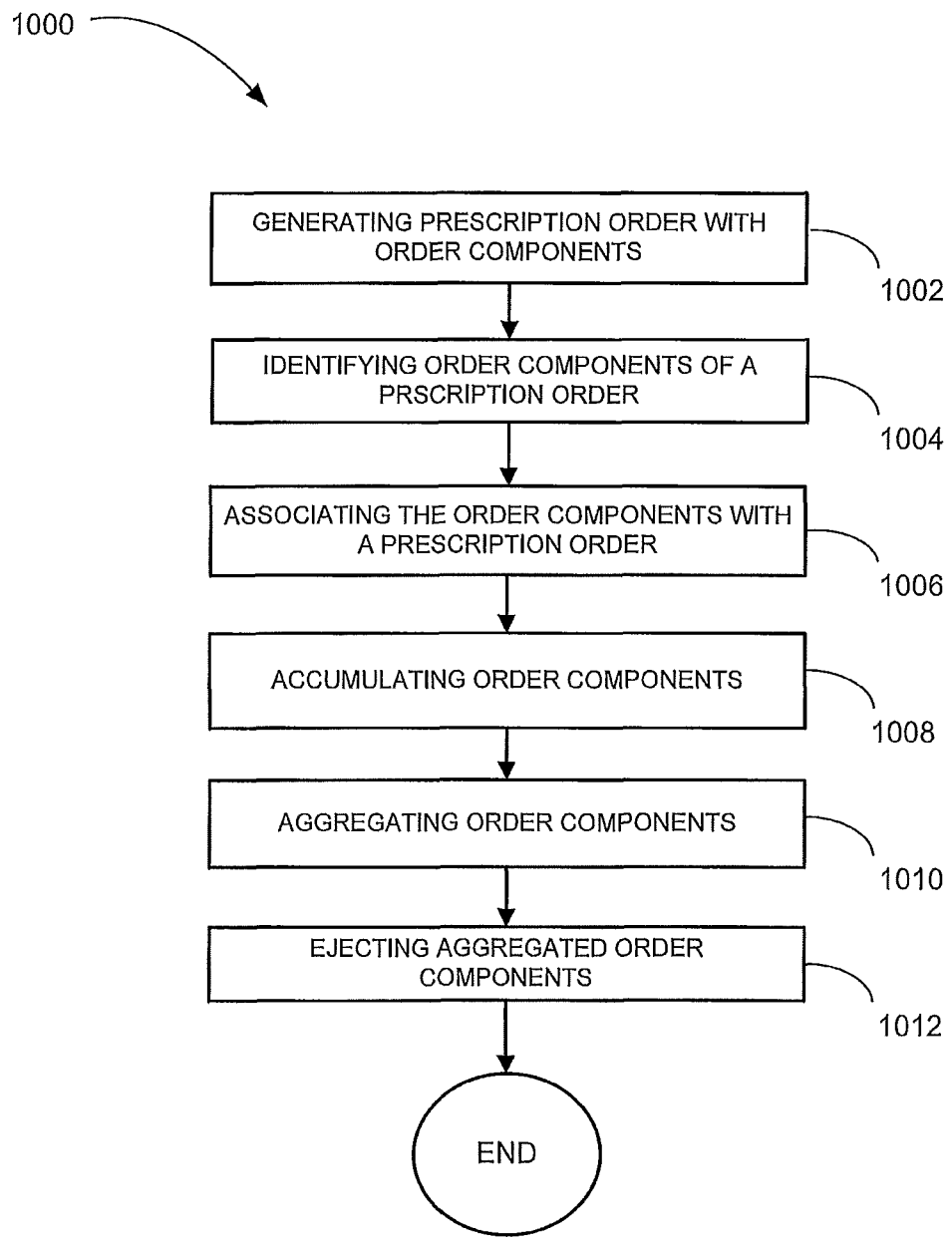
FIG. 10 is an example process flow illustrating a method of accumulation, according to an example embodiment.

FIG. 10 illustrates a method 1000 for order accumulation, according to an example embodiment. The method 1000 may be performed by the accumulation device 120, partially by the order processing device 102 and partially by the network manager device 106, or may be otherwise performed.

At block 1002, the order processing device 102 generates a prescription order with order components to be fulfilled. The fulfillment may include one or more of the devices 108-122 acting on one or more of the order components. Generating the prescription order may include accessing data 126-130 from the database 124 to determine desired characteristics of the prescription order.

At block 1004, order components of the prescription order are identified at the dispensing station 302, for example. The dispensing station 302 may receive the order component in the form of the container 402 from the conveyor 314 through the opening 308. The dispensing station 302 may obtain the order component in the form of a unit-of-use container 502 from the rack 506. The order components 402, 502 are identified by accessing order component identification attributes of the order components. In one embodiment, accessing may include scanning the container 402, 502 with the container scanner 406, 508. The robot picker 404, 504 may maneuver the container 402, 502 for scanning The order component may be identified with the accessed order component identification attribute.

At block 1006, the order components are associated with the prescription order. The control unit 322 may associate the order components with the prescription order. Specifically, when the presence of the order component at the dispensing station 302 is determined via the scanner 406, 508, the identified order component may be associated with the prescription order that is desired to be aggregated.

At block 1008, the order components are accumulated. In some embodiments, the order components may be accumulated at two or more locations. Specifically, order components may be accumulated into one bin apparatus 306 and order components may be accumulated into another bin apparatus 306. The robot picker 404, 504 may dispense the container 402, 502 to the bin apparatus 306. The order components that are dispensed into the bin apparatus 306 may be tracked.

At block 1010, the order components are aggregated. Movement of the transportable storage system 304 and locations of the carriage section 612 may be tracked. The carriage module 906 may designate a carriage section 612 of the carrier portion 610 for aggregating the prescription order. The carriage module 906 may designate more than one carriage section 612 for aggregating the prescription order, such as in the case of large prescription orders. The last or slowest container 402, 502 to be dispensed may be established. When all of the order components that constitute a prescription order are in the bin apparatus 306, the bin module 804 may issue a command to move the movable member 604 (FIGS. 6A and 6B). The time when the carriage section 612 is underneath the bin module is determined or detected and each bin apparatus 306 having an order component therein will drop the order component into the same designated carriage section 612 to aggregate the order components of the prescription order. In some embodiments, the transportable storage module 806 may issue one or more commands to increase or decrease velocity of the rotating carrier portion 610 to coordinate with dropping the order component from the bin apparatus 306.

At block 1012, the prescription order is ejected into a chute 320. The transportable storage system 304 may eject the contents of the carriage section 612 when the carriage section 612 is proximal the chute 320. The transportable storage system 304 may drop or push the order components into the chute 320 by using ejection mechanics, such as that provided by EuroSort, Inc.

Figure 11:
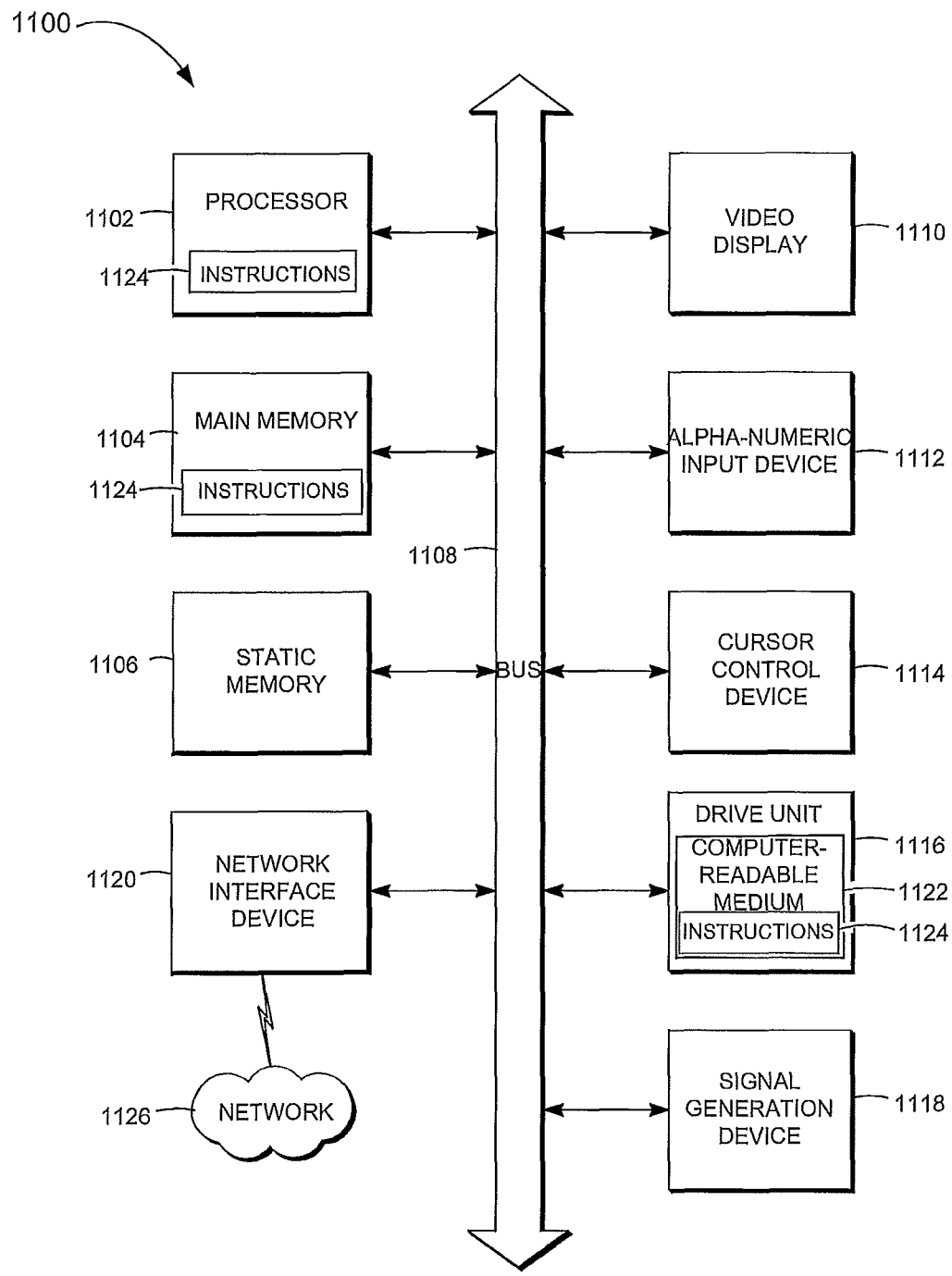
FIG. 11 is a block diagram of a machine in the example form of a computer system within which a set of instructions for causing the machine to perform any one or more of the methodologies discussed herein may be executed or stored.

FIG. 11 shows a block diagram of a machine in the example form of a computer system 1100 within which a set of instructions may be executed causing the machine to perform any one or more of the methods, processes, operations, or methodologies discussed herein. The order processing device 102, the network manager device 106, and/or the accumulation device 120 may include the functionality of the one or more computer systems 1100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 further includes a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a drive unit 1116, a signal generation device 1118 (e.g., a speaker) and a network interface device 1120.

The drive unit 1116 includes a computer-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof, by the computer system 1100, the main memory 1104 and the processor 1102 also constituting computer-readable media.

The software 1124 may further be transmitted or received over a network 1126 via the network interface device 1120.

While the computer-readable medium 1122 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a system is provided with a dispensing station including a receiving opening, a dispensing opening and a storage area. The dispensing station receives and dispenses a container. A transportable storage system is provided that includes multiple partitions disposed on a carrier portion to define multiple carriage sections. The carriage sections are electronically identifiable and selectively hold or eject the container. A bin apparatus is provided to receive the container dispensed by the dispensing station. The bin apparatus includes a movable portion to selectively hold and release the container. A control unit is provided to command the bin apparatus to dispense the container to a desired carriage section of the transportable storage system is provided.

In an example embodiment, order components of a prescription order are identified by accessing order component identification attributes. The order components are associated with a prescription order. Multiple order components are accumulated at two or more locations. The order components are aggregated from two or more locations onto a moving carrier. The aggregated order components are ejected.

Thus, methods and systems for accumulation have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A method comprising:
identifying at least one order component of a prescription order by accessing an identification attribute of the at least one order component;
associating the at least one order component with a prescription order;
accumulating a plurality of order components, including the at least one order component, at at least one location in an automated pharmacy fulfillment system with the plurality of order components being in a common orientation, wherein accumulating includes dropping the plurality of order components onto a moving carrier while maintaining the common orientation of the plurality of order components;
aggregating the plurality of order components from the at least one location onto a moving carrier that supports and moves the plurality of order components and maintaining the common orientation of the plurality of order components; and
ejecting the plurality of aggregated order components while maintaining the common orientation of the plurality of order components.

2. The method of claim 1, wherein the at least one order component includes at least one unit-of-use container and wherein accumulating includes accumulating the at least one unit-of-use container as one of the plurality of order components.

3. The method of claim 1, wherein identifying includes labeling the at least one order component of the prescription order.

4. The method of claim 1, further comprising receiving a container that includes prescription drug contents.

5. The method of claim 1, wherein aggregating depends on a time for a slowest order component to be dispensed.

6. The method of claim 1, wherein accumulating includes tracking the plurality of order components.

7. The method of claim 1, wherein aggregating includes tracking a rotational movement of the moving carrier.

8. The method of claim 7, wherein aggregating is performed at or before one rotation of the moving carrier.

9. The method of claim 7, wherein aggregating includes coordinating a release of the plurality of order components from the location with movement of the moving carrier.

10. The method of claim 1, wherein identifying includes scanning the at least one order component.

11. The method of claim 1, wherein aggregating includes scanning an RFID tag on each order component of the plurality of order components.

12. A method for filling a prescription order comprising:
identifying a plurality of order components of the prescription order by accessing at least one order component identification attribute of the plurality of order components;
associating the plurality of order components with a prescription order;
accumulating the plurality of order components of a prescription order at at least one dispensing station with the plurality of order components being in a common orientation, wherein accumulating comprises:
holding the plurality of order components at an incline relative to a carrier section of a moving carrier; and moving a movable portion of the dispensing station to drop the order components to the carrier section with the order components being in the common orientation;

aggregating the plurality of order components from the dispensing stations onto the carrier section at the common orientation; and ejecting the aggregated plurality of order components.

13. The method of claim 12, wherein aggregating comprises:

receiving the plurality of order components from accumulating the plurality of order components; and scanning the plurality of order components after receiving to identify the order components in the carrier section to verify that the order components in a carrier section are for a prescription order.

14. The method of claim 13, further comprising ejecting the plurality of order components from the carrier section to a packing and shipping system.

15. The method of claim 13, wherein scanning the plurality of order components comprises:

reading an RFID tag at each carrier section of a plurality carrier sections of the moving carrier to track the carrier section that moves along a track.

16. The method of claim 12, wherein associating the plurality of order components comprises:

transporting at least one order component of the plurality of order components to be accumulated at the dispensing station;

identifying the at least one order component with a robot picker to pick a container from a conveyor;

positioning the container proximal to a container scanner; and rotating the container about an axis during a scanning of a label of the container.

17. The method of claim 16, wherein the at least one order component identification attribute is stored in an machine readable code that associates container to the contents in the container.

18. A prescription order filling method comprising:

accumulating a plurality of prescription bottles at a dispensing station;

holding at least one prescription bottle of the plurality of prescription bottles at a storage area of the dispensing station;

dispensing the at least one prescription bottle from a dispensing opening at the dispensing station, wherein dispensing includes scanning the at least one prescription bottle to identify the at least one prescription bottle before the at least one prescription bottle exits the dispensing opening;

receiving the at least one prescription bottle from the dispensing station at a bin apparatus that includes a fixed portion and a movable portion to selectively hold and release the at least one prescription bottle from the bin apparatus;

transporting the at least one prescription bottle in one of a plurality of partitions disposed on a carrier portion, wherein transporting includes identifying a carriage section of a plurality of carriage sections of the carrier portion that is configured to selectively hold and eject the at least one prescription bottle, and hold the at least one prescription bottle at a substantially same orientation as the at least one prescription bottle had at the bin apparatus; and tracking the at least one prescription bottle identified by the scanning to associate the at least one prescription bottle to a prescription order, wherein tracking includes commanding the bin apparatus to dispense the at least one prescription bottle to the carriage section among the plurality of carriage sections to fill the prescription order.

19. The method of claim 18, wherein transporting the at least one prescription bottle comprises:

selecting the at least one prescription bottle from the storage area; and aligning the at least one prescription bottle to a container scanner to identify the at least one prescription bottle, wherein receiving the at least one prescription bottle includes moving a movable portion to allow the at least one prescription bottle on a floor of the bin apparatus to release the at least one prescription bottle therein toward the carrier portion.

20. The method of claim 19, wherein the floor of the bin apparatus is at a first angle and the carriage section is at a second angle, and wherein the second angle is less than or equal to the first angle.

21. The method of claim 18, wherein tracking the at least one prescription bottle comprises:

scanning the carriage section to identify the carriage section among the plurality of carriage sections; and opening an exit chute to remove the at least one prescription bottle from the identified carriage section.

22. The method of claim 18, wherein accumulating the plurality of prescription bottles comprises storing the plurality of prescription bottles at a rack in the storage area.

23. The method of claim 22, further comprising selecting, using a robot picker, the at least one prescription bottle from the rack and aligning the at least one prescription bottle to a container scanner to identify the at least one prescription bottle.

24. The method of claim 23, wherein dispensing the at least one prescription bottle comprises:

tracking a location of the carriage section; and ordering release of the at least one prescription bottle from the bin apparatus when the carriage section associated with a set prescription order is aligned with the bin apparatus.

25. The method of claim 24, wherein dispensing the at least one prescription bottle comprises:

controlling a plurality of bin apparatus to release a plurality of the prescription bottles to a same carriage section associated with the set prescription order.

* * * * *